United States Patent [19]
Thompson et al.

[11] Patent Number: 5,114,365
[45] Date of Patent: May 19, 1992

[54] WALL PLATE

[75] Inventors: William H. Thompson, 66 Washington Rd., Pittsford, N.Y. 14534; Alan W. Brownlie, Skaneateles, N.Y.

[73] Assignee: William H. Thompson, Pittsford, N.Y.

[21] Appl. No.: 575,334

[22] Filed: Aug. 30, 1990

[51] Int. Cl.⁵ .............................................. H01R 13/74
[52] U.S. Cl. ...................................... 439/540; 174/66
[58] Field of Search ...................... 439/536, 540, 676; 174/66

[56] References Cited

U.S. PATENT DOCUMENTS

| | | | |
|---|---|---|---|
| 2,385,620 | 9/1945 | Fleckenstein | 174/66 X |
| 3,522,595 | 8/1970 | White | 174/66 |
| 4,451,108 | 5/1984 | Skidmore | 439/536 |
| 4,494,815 | 1/1985 | Brzostek et al. | 439/536 |
| 4,541,680 | 9/1985 | Johnston . | |
| 4,569,567 | 2/1986 | Zucchini . | |
| 4,648,682 | 3/1987 | Tubbs . | |
| 4,740,172 | 4/1988 | Tubbs . | |
| 4,850,901 | 7/1989 | Smith et al. . | |
| 4,875,881 | 10/1989 | Caveny et al. . | |
| 4,897,049 | 1/1990 | Miller et al. . | |
| 4,899,127 | 2/1990 | MacFadyen et al. . | |
| 4,899,217 | 2/1990 | MacFadyen et al. . | |
| 5,007,860 | 4/1991 | Robinson et al. | 439/540 |

OTHER PUBLICATIONS

"Home Newsfront" article, Popular Science, Nov. 1990, p. 52.
"The World's Smartest Houses", by V. Elaine Gilmore, Popular Science, Sep. 1990, pp. 56–57.
"The Integrated Automated Educated House", by V. Elaine Gilmore, Popular Science, Jun. 1990, pp. 104–107.
"The Smart House Partnership" brochure, Dec. 29, 1989.
"Smart House" advertisement, Professional Builder, Dec. 1989.
Publication by Brand-Rex Cable Systems Division, Willimantic, CT.

Primary Examiner—Eugene F. Desmond
Attorney, Agent, or Firm—Eugene Stephens & Associates

[57] ABSTRACT

A wall plate for use with a standard electrical outlet includes an extended portion for mounting a modular telephone jack and a male terminal of a coaxial video cable. Integrally molded sockets projecting from a back surface of the plate are used to mount the telephone jack and video terminal. The sockets are positioned in the plate so that the plate may be inverted for locating the telephone jack and video terminal on either side of a standard electrical box. Means including a break-away seat for the video terminal and brackets molded integrally with the plate are used to protect the plate against breakage.

30 Claims, 5 Drawing Sheets

WALL PLATE

BACKGROUND OF INVENTION

Wall plates are a common fixture in most homes and businesses for covering connections to electrical outlets mounted on walls. The connections are made within electrical boxes that are anchored to supports within the walls. Open ends of the boxes are accessible through holes formed in the walls for making the connections to the electrical outlets. The wall plates are mounted on the outlets and cover both the electrical boxes and the access holes that are formed in the walls. One or more openings are formed in the plates to permit receptacles of the electrical outlets to project into front faces of the plates for receiving electrical plugs.

Most of the wall plates are either stamped out of sheet metal or molded from a resin material. Except for so-called "designer" wall plates, which may also be made of wood or ceramic, most wall plates are available in standard sizes and shapes. The most common wall plates are sized to accommodate electrical outlets with duplex receptacles. Similarly sized wall plates are also used to cover connections to a variety of other electrical fixtures including wall switches and communication outlets.

For example, similarly sized wall plates are used for mounting modular telephone jacks and coaxial video cable terminals. Although the plates are the same size which is used to cover the standard electrical boxes, the telephone and video connections are often made without a box. The telephone jacks and video terminals are mounted directly on the wall plates, and the wall plates are attached to wall surfaces with screws or brackets.

Wall plates mounting telephone and video communication outlets are generally located on wall surfaces independently of each other and independently of the locations of the electrical outlets. Separate wires are threaded through walls to predetermined locations at which telephone or video service is desired. However, in new construction, it is often difficult to predict the locations at which the various services may be needed. Also, there appears to be an increasing demand for telephone and video outlets in more rooms and in more than one location within each room. The large number of wall plates required to provide the desired services tends to detract from the appearance of walls which become cluttered with wall plates. Construction is also complicated by the large number of different mounting locations for the different services; and as a result, the availability of the services in desired locations is often curtailed for reasons of expense or appearance.

Recently, communication and energy control systems have become available that link together different services distributed throughout the houses. One known system, disclosed in U.S. Pat. No. 4,899,217 to Mac-Fadyen et al., includes an appliance coordination data network, an energy distribution network, analog and digital data communications networks, and a video services distribution network. The various networks share common outlets which are positioned throughout a house. However, in most new homes, the new systems are expected to be prohibitively expensive. Although a single composite cable may be used for transmitting electrical power and telephone, data, and video signals, the outlets include nonstandard receptacles requiring special plugs that are not available for most appliances. In addition, most appliances are not designed with communication capabilities which would enable them to benefit from the network interface available at each outlet.

A more longstanding problem also exists with respect to making coaxial video cable connections at conventional wall plates. Although it is preferable to tighten cable connections together with a wrench, the connections are often made without a wrench because of the inconvenience of finding the correct size wrench. Other times, it is difficult to fit a conventional wrench within a limited space surrounding the cable terminal. As a result, many video connections are not properly made and the quality of video service is diminished.

SUMMARY OF THE INVENTION

Our invention is directed to providing a cost effective way of providing audio and video service to all desired locations within a building. Notwithstanding various networking possibilities that are compatible with our invention, it is a specific objective of our invention to provide improved access to audio and video communication services by incorporating outlets to the services into the same wall plates used for covering connections to standard electrical outlets. Accordingly, our invention provides for expanding access to audio and video communication services without requiring use of any additional wall plates over those normally used for electrical service.

Our wall plate is actually an improvement over the familiar design of conventional wall plates. Basic features of the conventional plates are preserved, including openings for exposing electrical receptacles and holes for mounting the plates on the electrical outlets, but the plates are also extended in length to provide for mounting at least one of an audio and video communication outlet. For example, respective sockets having integrally formed wall portions projecting from a back surface of the plates may be used to mount a telephone jack and a male terminal of a coaxial video cable on the plates. Each socket is aligned with an opening formed in the front surface of the plates to provide access to the telephone jack and video terminal.

The extended portion of the plates reaches beyond an open end of an electrical box within which connections to the electrical outlet are made. Thus, the connections to the telephone jack and video terminal are effectively isolated from the electrical connections by being made outside of the electrical box. This feature enables the connection to the telephone jack and video terminal to be made independently of the connections to the electrical outlet and thereby prevent dangerous electrical shock or a line-to-line fault between the wires.

Ordinarily, the electrical boxes are mounted on the sides of wall studs, and the electrical wires enter and exit the boxes at their tops and bottoms. Accordingly, only one side of the electrical boxes may be clear of obstruction. However, the extended portion of our plates locates the telephone and video sockets so that the plates may be inverted for mounting the sockets on either side of the electrical boxes. This feature enables the telephone and video connections to be made on either side of the electrical boxes that is clear of obstruction.

Our new plates may be mounted on wall surfaces in the usual manner. In other words, the standard electrical outlets are used for both orienting the plates and attaching them on the walls. However, a larger hole is made in the wall to allow for connection of a telephone wire and video cable to the plates. The enlarged part of the hole is covered by the extended portion of the plates when the plates are mounted on the electrical outlet.

Conventional wall plates covering electrical outlets are generally not used to support anything. However, according to the present invention, our wall plates may be used to mount both a telephone jack and a video terminal. These additional structural requirements are accommodated in the design of the new plates to help avoid any breakage of the plates that could expose the electrical connections.

Accordingly, one version of our plates provides break-away seats for mounting the coaxial video cable terminals on the plates. The break-away seats are designed so that if a force is applied to a video cable connection, the seats will break away in advance of any other portion of the plates. This would leave a small hole in the plates, but the cable connection would be left intact.

Another version provides for using one or more integrally molded brackets for gripping a back surface of the mounting wall. Pushing forces against the plates are resisted by the entire periphery of the plates acting against a front surface of the wall. Any pulling forces against the extended portion of the plates are resisted by the brackets.

Yet another version calls for the plate to be made of an unbreakable rubber-like material that includes sufficient elasticity to resist breaking. For example, it would be possible to make the plates out of a molded resin elastomer.

The invention also includes a novel snap-on wrench that is particularly designed to help tighten the video cable connections in place on our wall plates. The male terminal of the video cable may be protected within a recess formed in the front surface of the plates. As a result, sufficient clearance may not be available to use a conventional wrench to tighten a female cable connector to the terminal. One version of the snap-on wrench fits over the end of the cable capturing, within a specially formed region, a nut which is carried on the female connector of the cable. The snap-on wrench is dimensioned with respect to the socket supporting the male terminal so that there remains a small clearance between the wrench and the plate after the cable is tightened in place.

Another version of the snap-on wrench includes a two-part design joined by a hinge that may be opened to receive the female connector and closed with a snap-tight engagement to capture the nut portion of the terminal within the wrench. Both versions may be left in place on the cable terminals for protecting and insulating the cable connections during use. By so doing, the snap-on wrenches also remain available for loosening the same cable connections.

DETAILED DESCRIPTION

Figure 1:
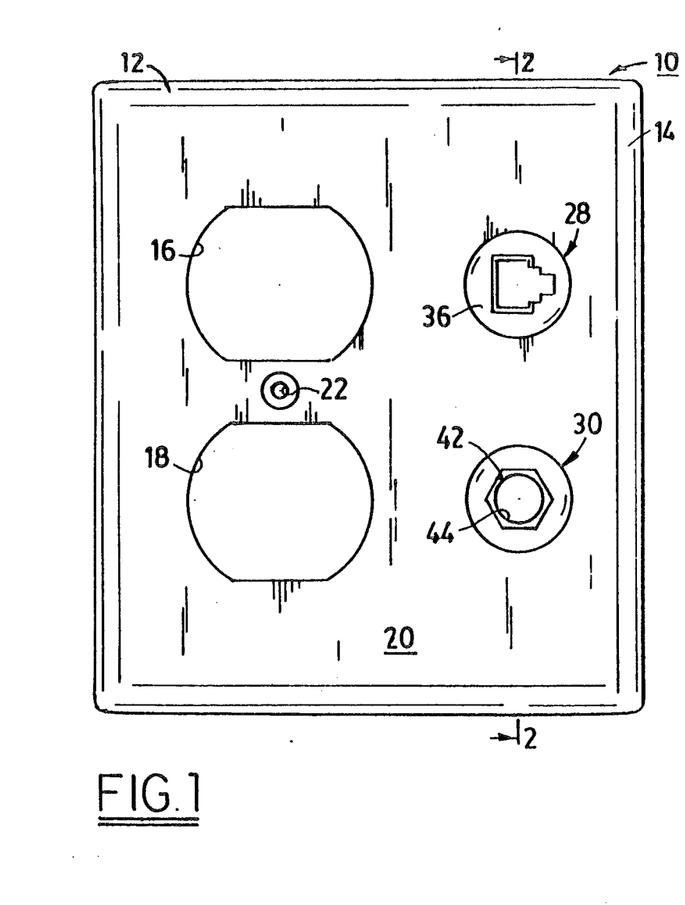
FIG. 1 is a front view of one example of our wall plate showing openings for standard duplex receptacles, as well as terminals for telephone and video communication outlets.
Figure 2:
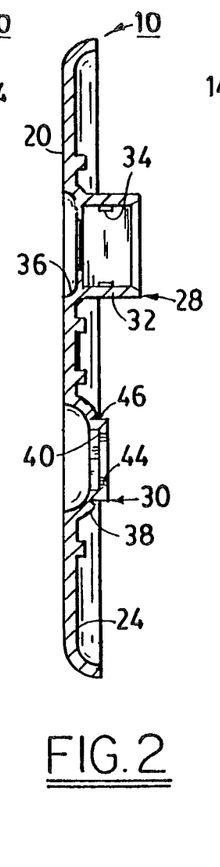
FIG. 2 is a cross-sectional side view showing in better detail integrally molded sockets for supporting the telephone and video terminals.
Figure 3:
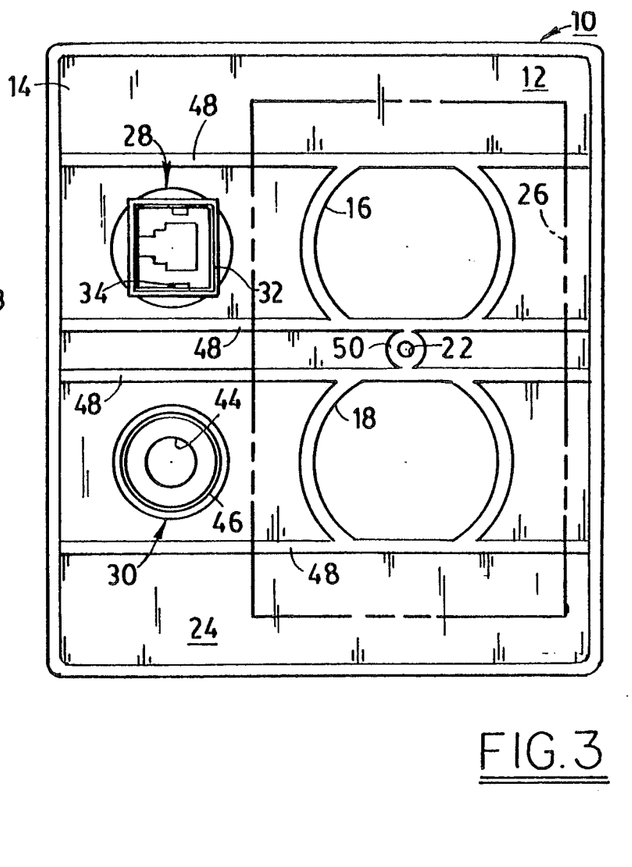
FIG. 3 is a back view of the same plate shown in FIGS. 1 and 2 showing a ribbed construction of the plate.

An example of our wall plate is shown in FIGS. 1 through 3. The plate 10 includes a main body 12 that is dimensioned on three sides similar to a conventional wall plate, but includes an extended portion 14 that enlarges one side of the plate. Openings defined by the familiar shape of outlines 16 and 18 provide for exposing the receptacles of a conventional electrical outlet in front surface 20 of the plate. Recessed mounting hole 22 is also formed in front surface 20 for mounting the plate in a conventional manner on the electrical outlet.

The extended portion 14 elongates the front surface 20 and back surface 24 of the plate beyond one side of a conventional electrical box shown in phantom line at 26 in FIG. 3. Within extended portion 14, two sockets designated generally at 28 and 30 are formed for respectively mounting a modular telephone jack and a male terminal of a coaxial video cable on the plate. The telephone socket includes rectangular wall portions 32 that project from back surface 24 of the plate. A pair of bosses 34 are formed within the wall portions 32 for engaging similarly sized notches of a conventional telephone jack. A recessed opening 36 is formed in front surface 20 in alignment with a space between the wall portions 32 for receiving a modular telephone plug.

Video socket 30 is similarly formed by wall portions 38 that project from back surface 24 of the plate. However, the wall portions 38 take the form of a cavity formed in the front surface 20 of the plate. Within the cavity is formed an annular seat 40 for mounting the male terminal of the coaxial cable. The annular seat 40 includes a hexagonal recess 42 for capturing a similarly sized nut of the male video terminal. An opening 44 is also formed in the seat enabling the male terminal to project into a hollow space within the cavity defined in front surface 20 for connection with a female cable connector. The outer surfaces of wall portions 38 are circumscribed by notch 46 which forms a break-away joint for detaching seat 40 from the rest of the plate in response to a force applied to the video terminal that would otherwise break another portion of the plate.

Plate 10 is also reinforced against breakage by a series of longitudinal ribs 48 that are formed in the back surface 24 of the plate. Two of the longitudinal ribs 48 join with an annular rib 50 for reinforcing mounting hole 22 in the plate.

Figures 4, 5:
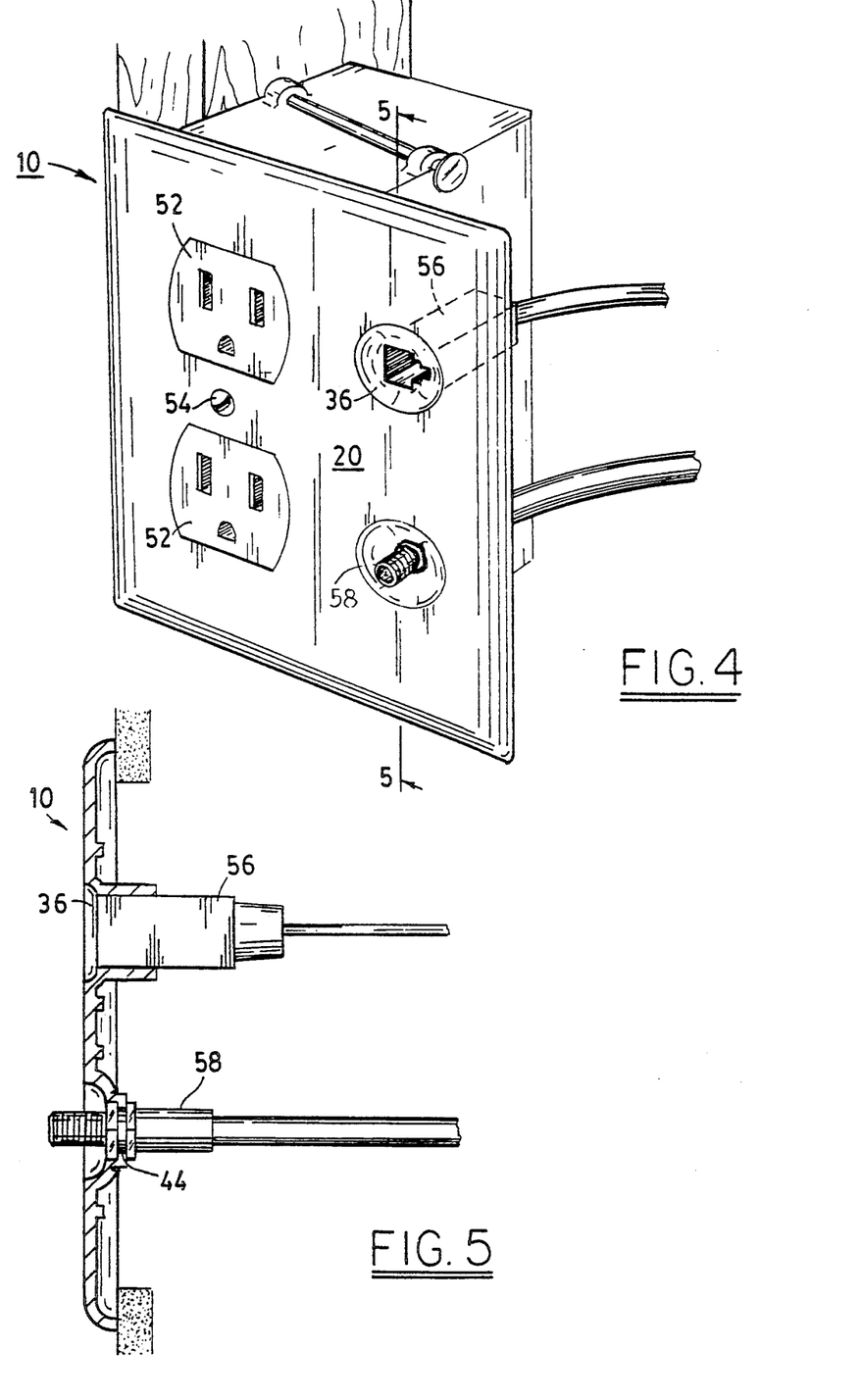
FIG. 4 is a prospective view of the plate illustrated in the preceding figures with a telephone jack and male terminal of a coaxial video cable mounted on the plate.
FIG. 5 is a cross-sectional view similar to FIG. 2, but showing the telephone jack and video terminal mounted within respective sockets formed in the plate.

FIGS. 4 and 5 show two different views of plate 10 assembled for providing telephone and video services. Visible in front surface 20 are duplex receptacles 52 of a conventional electrical outlet. Plate 10 is attached to the outlet in a conventional manner by screw 54. Also apparent are the opening 36 exposing modular telephone jack 56 and the opening 44 through which video terminal 58 projects into the front surface 20. Both the telephone jack and the video terminal are of conventional design and are readily available without further adaptation for use with our plate. However, the conventional telephone jack is preferably of the type which exposes at least three pairs of wires. Any additional wires over those required for telephone or intercom service may be used to transmit other signals, including analog or digital signals for a variety of other well-known purposes.

Figures 6, 7, 8:
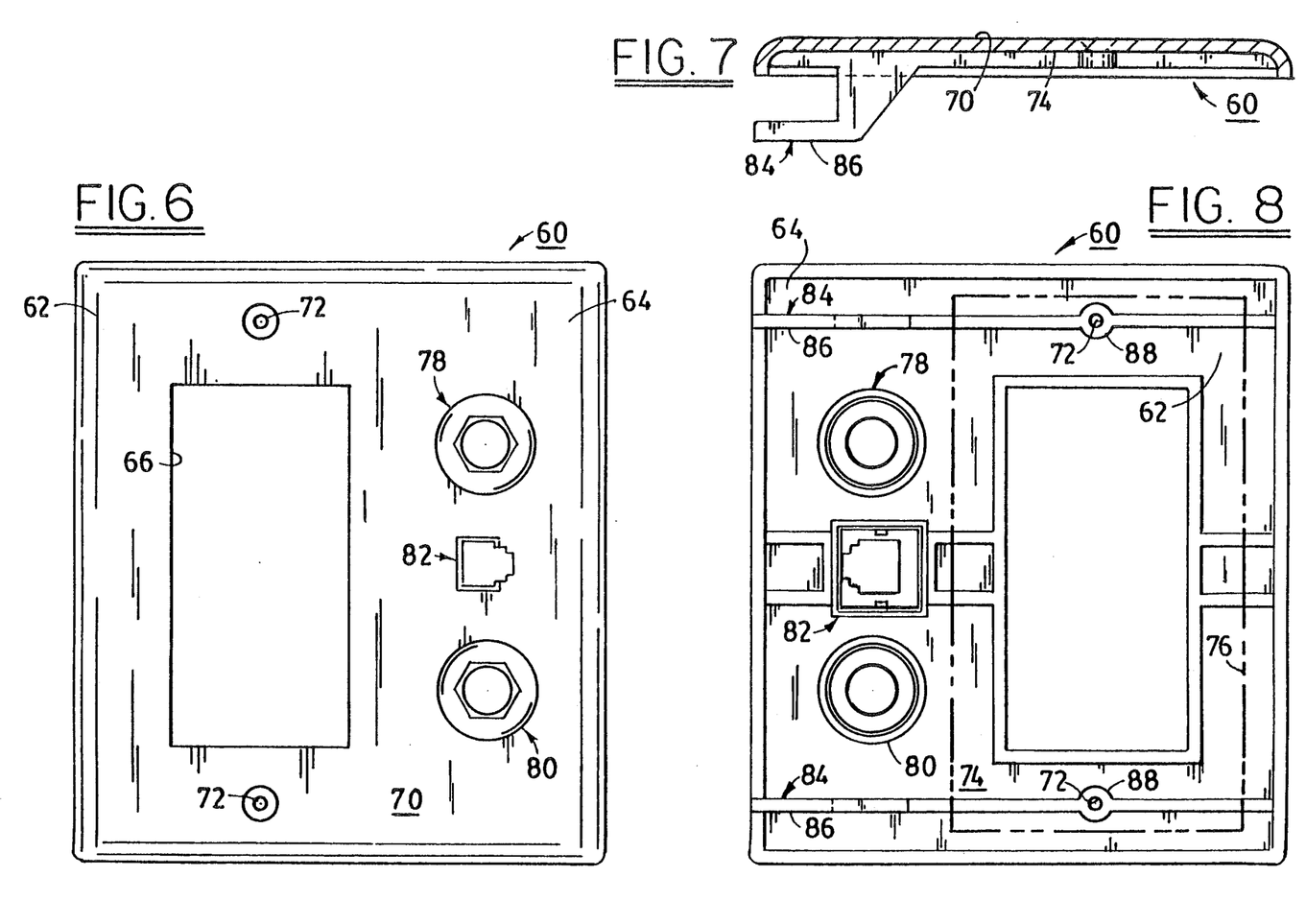
FIG. 6 is a front view of another embodiment of our wall plate showing an opening for exposing rectangularly shaped duplex receptacles of another standard electrical outlet, and also showing a pair of sockets for mounting a telephone jack and video terminal similar to the preceding example.
FIG. 7 is a cross-sectional end view of the alternative wall plate showing a bracket arm for contacting a back surface of conventional wallboard.
FIG. 8 is a view of the back of the alternative plate showing the mounting brackets and reinforcing ribs formed in the back surface of the plate.

Another example of our wall plate is shown in FIGS. 6 through 8. The alternative wall plate 60 also includes a main body portion 62 of conventional configuration and an extended portion 64. An opening inscribed by rectangular outline 66 in front surface 70 matches a rectangularly shaped duplex receptacle of a conventional electrical outlet. Recessed holes 72 formed in front surface 70 provide for mounting the plate on the electrical outlet in a conventional manner.

Extended portion 64 elongates the front surface 70 and back surface 74 at one side of the plate 60 beyond the usual region occupied by an open end of an electrical box 76, which is indicated by phantom line in FIG. 8. Two sockets 78 and 80 are formed in the extended portion for mounting a pair of video cable terminals; and a third socket 82, located between the video sockets, is provided for mounting a modular telephone jack. The video and telephone sockets may be formed similar to the respective sockets described in the preceding example.

However, instead of relying solely on break-away joints to protect the plate against breakage, brackets 84, projecting from back surface 74, are used to secure the plate against a back surface of conventional wallboard. The brackets include arms 86 that bear against the wallboard and resist any forces which would tend to pull the plate away from a wall. The arms 86 extend together in the same general direction along the length of the plate to facilitate mounting the plate on the wall.

Another option for protecting our plate against breakage is to manufacture the plate out of a rubber-like material that includes sufficient structural integrity to mount the various outlets but is otherwise flexible. For example, our plate could be molded from any one of a number of well-known resin elastomers. However, if the rubber-like material is used, it is especially important to reinforce the mounting hole of the plate to prevent inadvertent removal of the plate from the wall. Annular ribs 50 and 88, shown respectively in FIGS. 3 and 8, would be appropriate for this purpose.

Figure 9:
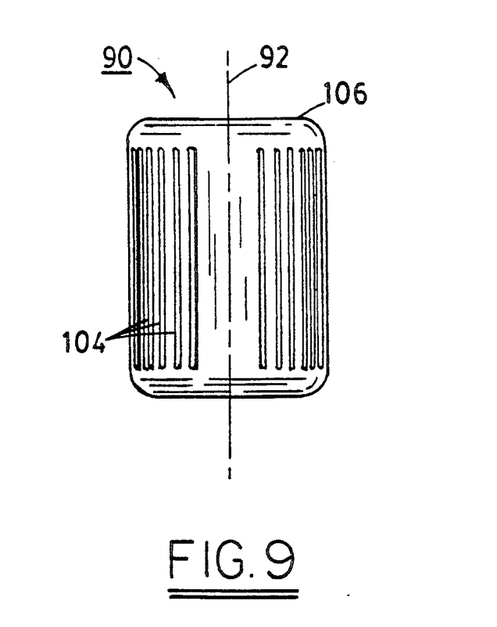
FIG. 9 is an exterior view of a snap-on wrench for tightening female cable connectors to male terminals of the coaxial cable.
Figure 10:
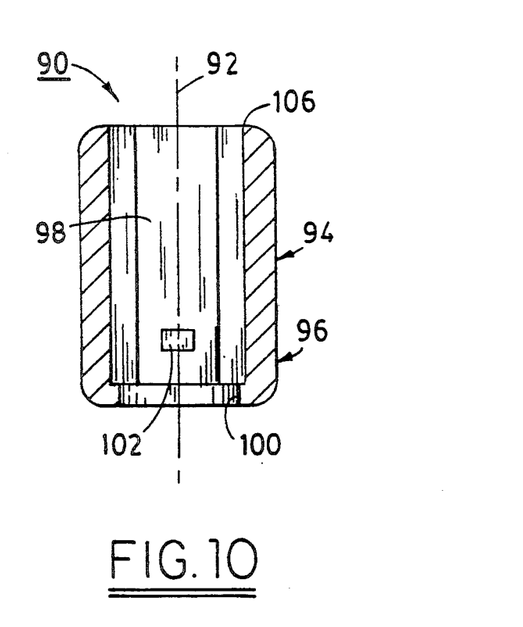
FIG. 10 is a longitudinal cross-sectional view through the snap-on wrench of FIG. 9.
Figure 11:
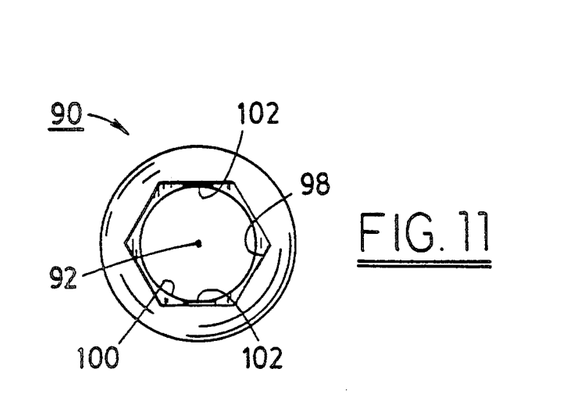
FIG. 11 is an end view of the same snap-on wrench.
Figure 12:
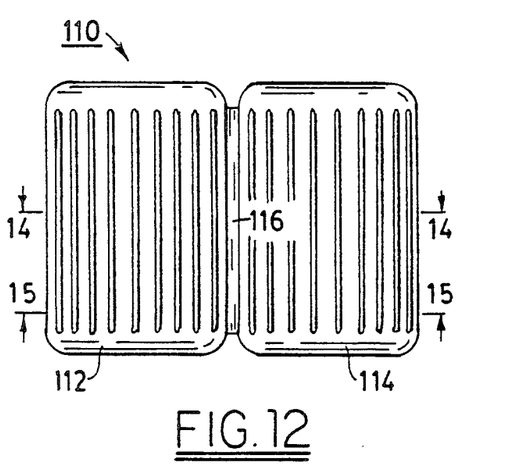
FIG. 12 is an exterior view of a second example of a snap-on wrench for tightening female connectors to male video terminals.

A first example of a snap-on wrench that may be used to tighten cable connections to our plate is illustrated by FIGS. 9 through 11. The male video terminals are protected by the recesses formed in our plate, but this makes tightening female cable connectors to the terminals more difficult. However, the snap-on wrench may be fit over the end of the cable, capturing the nut portion of the female connector within it, to provide a more convenient means for tightening the connector in place.

The snap-on wrench, designated generally at 90, includes a generally cylindrical body defining an axis of rotation 92. Along the axial length of the cylindrical body, the wrench includes a handle portion 94 and a socket portion 96. The two portions are distinguished by the inner surfaces of the wrench which are exposed by the orthogonal cross-sectional views of FIGS. 10 and 11. A polygonally shaped channel 98 is formed for most of the length of snap-on wrench 90. Preferably, the channel takes a hexagonal cross-sectional shape to more exactly match the shape of standard female cable connector nuts. The channel terminates at a round opening 100 that is sized to permit an open end of the female connector to extend out of the wrench. However, the opening 100 is sized smaller than the nut of the female connector to limit axial movement of the connector within the channel. In that regard, the opening 100 forms a stop at the end of the wrench body to prevent the female connector from passing any further through the wrench.

A pair of bosses 102 project into the channel 98 to position the connector nut in a snap-fit engagement against the stop (i.e., opening) 100. The channel 98 in the space between bosses 102 and stop 100 defines the socket portion 96 that holds the connector nut against rotation with respect to the wrench. The remaining length of channel 98 provides clearance for initially moving the connector nut along the length of the wrench into position within the socket portion. Consequently, the channel is also amply dimensioned to permit relative rotation between the wrench and the smaller diameter of the coaxial cable on which the connector is mounted.

The additional length of the wrench along the remaining portion of the channel 98 defines the handle portion 94, whose primary purpose is to provide a better grip for turning the socket portion of the wrench. Knurls 104 are formed in the outer periphery of the wrench to further promote grip.

During use, end 106 of the wrench may be fit over the open end of the female connector until the connector nut is snap-fit in place within the socket portion 96 of the wrench. While the open end of the connector is exposed through opening 100, the handle portion 94 of the wrench may be turned independently of the cable for tightening the female connector on a male terminal mounted on our wall plates. The axial length of opening 100, together with the outer periphery of the wrench, is dimensioned with respect to the sockets of our wall plates so that a small clearance is provided between the wrench and the front surface of the wall plates after the cable connectors have been tightened in place.

Figure 15:
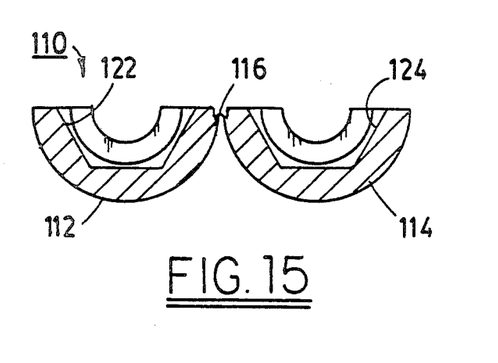
FIG. 15 is another view in traverse cross section through a portion of the wrench which is shaped for capturing the hexagonal nut portion of a female connector.
Figure 16:
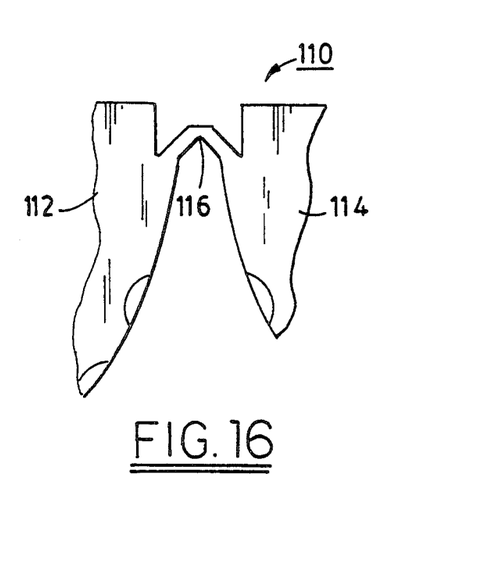
FIG. 16 is a greatly enlarged partial end view showing in greater detail a hinge for connecting the two halves of the wrench.

Another example of a snap-on wrench for tightening cable connections is illustrated by FIGS. 12 through 16. The wrench 110 includes two halves 112 and 114 that are separated by a hinge 116. An integrally molded latching mechanism is made up of pawl 118 and notch 120 for closing the two halves 112 and 114 together with snap-type engagement. Molded recesses 122 and 124 cooperate to form a single hexagonal section for capturing the nut portion of the female connector after the two halves of the wrench have been closed together. With particular reference to FIG. 16, it may be seen that the hinge 116 is formed slightly offset from the opposing surfaces of the two halves 112 and 114 to help hold the halves tightly together after the hinge has been closed.

Figure 13:
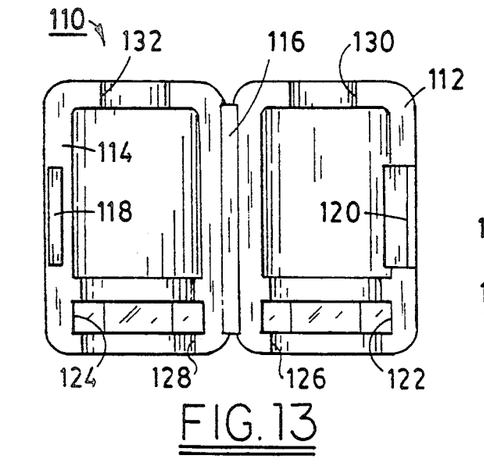
FIG. 13 is an interior view which shows two halves of the second snap-on wrench swung open about a common hinge.
Figure 14:
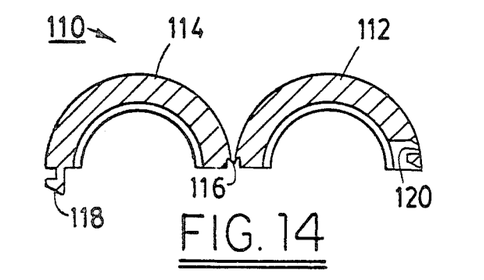
FIG. 14 is a cross-sectional view of the second snap-on wrench in a traverse section showing a latching mechanism for closing the two halves of the wrench together.

Recesses 126 and 128 in the respective halves join to form a round opening that permits the open end of the female connector to extend out of the wrench. Similarly, recesses 130 and 132 cooperate to provide appropriate clearance for the cable to extend out of the wrench. The two recesses 122 and 124 that form the hexagonal section for capturing the connector nut, together with the recesses 126 and 128 that form the opening for exposing the connector, define the socket portion of wrench 110. The remainder of the wrench defines the handle portion. Both portions of wrench 110 function in much the same way as in the earlier described wrench 90. However, the two-half design of wrench 110 permits the wrench to be removed after tightening the connector in place.

We claim:

1. In a wall plate for covering an open end of an electrical box recessed within a wall and for exposing duplex receptacles of a standard electrical outlet mounted on the electrical box, the wall plate being of the type including:
    an integral plate having front and back surfaces, a first opening formed through said plate and shaped to enclose peripheral surfaces of the receptacles that project into said front surface of the plate, and a mounting hole formed through said plate and sized for capturing a head portion of a screw that extends into engagement with the duplex outlet, characterized by:
    an extended portion of said plate for elongating said front and back surfaces of the plate beyond one side of the open end of the electrical box;
    a socket formed in said extended portion with integrally formed wall portions projecting from said back surface of the plate for mounting a communication outlet on said plate;
    a second opening formed through said plate for exposing the communication outlet in said front surface of the plate;
    said socket being positioned in said extended portion so that said plate may be mounted in inverted positions with respect to the standard electrical outlet for locating said socket on either side of the electrical box;
    said socket providing for mounting one of an audio and video communication outlet to said plate; and
    said integrally formed wall portions of the socket forming a cavity in said front surface of the plate with an annular seat at a base of said cavity for mounting a male terminal of a coaxial video cable on said plate.

2. The wall plate of claim 1 in which said second opening is formed through said annular seat and is sized to receive the male terminal of the coaxial video cable projecting into said cavity and said cavity is sized to receive a female connector of the coaxial cable.

3. The wall plate of claim 2 in which said annular seat includes a pocket that is shaped for capturing a nut portion of the male terminal of the coaxial cable.

4. The wall plate of claim 3 in which said annular seat is joined to a remaining portion of said cavity by a break-away joint for detaching said annular seat together with the male terminal of the coaxial cable from said plate in response to a force applied to the coaxial cable that would otherwise break another portion of said plate.

5. The wall plate of claim 1 in which said plate is formed from a rubber-like material that includes elastic properties for resisting fracture.

6. The wall plate of claim 1 including ribs formed in said back surface of the plate adjacent to said mounting hole for making said plate more rigid.

7. The wall plate of claim 1 including a bracket formed in said extended portion by an integral projection from said back surface of the plate for bearing against a back surface of the wall.

8. The wall plate of claim 7 in which said bracket includes an arm that extends to an outer periphery of said plate.

9. In a wall plate for covering an open end of an electrical box recessed within a wall and for exposing duplex receptacles of a standard electrical outlet mounted on the electrical box, the wall plate being of the type including:
    an integral plate having front and back surfaces, a first opening formed through said plate and shaped to enclose peripheral surfaces of the receptacles that project into said front surface of the plate, and a mounting hole formed through said plate and sized for capturing a head portion of a screw that extends into engagement with the duplex outlet, characterized by:
    an extended portion of said plate for elongating said front and back surfaces of the plate beyond one side of the open end of the electrical box;
    a socket formed in said extended portion with integrally formed wall portions projecting from said back surface of the plate for mounting a communication outlet on said plate;
    a second opening formed through said plate for exposing the communication outlet in said front surface of the plate;
    said socket being positioned in said extended portion so that said plate may be mounted in inverted positions with respect to the standard electrical outlet for locating said socket on either side of the electrical box;
    said socket providing for mounting one of an audio and video communication outlet to said plate;
    a second socket formed in said extended portion with integrally formed wall portions projecting from said back surface of the plate for mounting another communication outlet; and a third opening formed through said plate for exposing the another communication outlet in said front surface of the plate;
    one of said sockets providing for mounting a modular telephone jack and the other of said sockets providing for mounting a male end terminal of a coaxial video cable; and said integrally formed wall portions of one of said sockets being arranged in a rectangular pattern on said back surface of the plate for mounting a modular telephone jack on said plate and said integrally formed wall portions of the other of said sockets forming a cavity in said front surface of the plate with an annular seat at a base of said cavity for mounting a male terminal of a coaxial video cable on said plate.

10. The wall plate of claim 9 including a third socket formed in said extended portion with integrally formed wall portions projecting from said back surface of the plate for mounting a second video terminal, and a fourth opening formed through said plate for exposing the second video terminal in said front surface of the plate.

11. The wall plate of claim 10 in which said integrally formed wall portions of the third socket form a second cavity in said front surface of the plate with an annular seat at a base of said second cavity for mounting a male terminal of a second coaxial video cable on said plate.

12. The wall plate of claim 11 in which said fourth opening is formed through said annular seat of the second cavity and is sized to receive the male terminal of the second coaxial video cable projecting into said cavity.

13. The wall plate of claim 12 in which said annular seat of the second cavity includes a pocket that is shaped for capturing a nut portion of the male terminal of the second coaxial cable.

14. The wall plate of claim 13 in which said annular seat of the second cavity is joined to a remaining portion of said second cavity by a break-away joint for detaching said annular seat of the second cavity together with the male terminal of the second coaxial cable from said plate in response to a force applied to the second coaxial cable that would otherwise break another portion of said plate.

15. A wall plate comprising:
an integral plate having front and back surfaces;
a first portion of said plate being sized for covering electrical connections to an electrical outlet mounted on an electrical box that is recessed within a wall;
a first opening formed in said first portion of the plate and shaped for exposing an electrical receptacle of the electrical outlet in said front surface of the plate;
a mounting hole for attaching said plate to the electrical outlet;
a second portion of said plate being sized for extending beyond an open end of the electrical box and for covering a wall opening that permits access to a communications wire located outside of the electrical box;
a socket for mounting a terminal of the communications wire in said second portion of the plate;
a second opening formed in said second portion of the plate for exposing the terminal of the communications wire in said front surface of the plate;
said socket being positioned in said second portion for permitting the communications wire to be connected to the terminal mounted on said socket outside of the electrical box;
means for resisting fracture of said first portion of the plate in response to a force applied to the terminal of the communications wire mounted in said second portion of the plate; and
said socket including an annular seat for mounting a male terminal of a coaxial video cable.

16. The wall plate of claim 15 in which said means for resisting fracture of the first portion of the plate includes a break-away joint formed between said seat and a remaining portion of said socket.

17. The wall plate of claim 16 in which said means for resisting fracture of the first portion of the plate also includes ribs formed in said back surface of the plate adjacent to said mounting hole.

18. A wall plate comprising:
An integral plate having front and back surfaces;
a first portion of said plate being sized for covering electrical connections to an electrical outlet mounted on an electrical box that is recessed within a wall;
a first opening formed in said first portion of the plate and shaped for exposing an electrical receptacle of the electrical outlet in said front surface of the plate;
a mounting hole for attaching said plate to the electrical outlet;
a second portion of said plate being sized for extending beyond an open end of the electrical box and for covering a wall opening that permits access to a communications wire located outside of the electrical box;
a socket for mounting a terminal of the communications wire in said second portion of the plate;
a second opening formed in said second portion of the plate for exposing the terminal of the communications wire in said front surface of the plate;
said socket being positioned in said second portion for permitting the communications wire to be connected to the terminal mounted on said socket outside of the electrical box;
means for resisting fracture of said first portion of the plate in response to a force applied to the terminal of the communications wire mounted in said second portion of the plate; and
said means for resisting fracture of the first portion of the plate including a bracket formed in said second portion of the plate by an integral projection from said back surface of the plate.

19. The wall plate of claim 18 in which said bracket includes an arm that extends at least to an outer periphery of said plate for bearing against a back surface of the wall.

20. A wall plate comprising:
an integral plate having front and back surfaces;
a first portion of said plate being sized for covering electrical connections to an electrical outlet mounted on an electrical box that is recessed within a wall;
a first opening formed in said first portion of the plate and shaped for exposing an electrical receptacle of the electrical outlet in said front surface of the plate;
a mounting hole for attaching said plate to the electrical outlet;
a second portion of said plate being sized for extending beyond an open end of the electrical box and for covering a wall opening that permits access to a communications wire located outside of the electrical box;

a socket for mounting a terminal of the communications wire in said second portion of the plate;

a second opening formed in said second portion of the plate for exposing the terminal of the communications wire in said front surface of the plate;

said socket being positioned in said second portion for permitting the communications wire to be connected to the terminal mounted on said socket outside of the electrical box;

means for resisting fracture of said first portion of the plate in response to a force applied to the terminal of the communications wire mounted in said second portion of the plate; and said means for resisting fracture of said first portion of the plate including forming said plate from a rubber-like material that includes elastic properties for resisting fracture.

21. A wall plate comprising:

an integral plate having front and back surfaces;

a first portion of said plate being sized for covering electrical connections to an electrical outlet mounted on an electrical box that is recessed within a wall;

a first opening formed in said first portion of the plate and shaped for exposing an electrical receptacle of the electrical outlet in said front surface of the plate;

a mounting hole for attaching said plate to the electrical outlet;

a second portion of said plate being sized for extending beyond an open end of the electrical box and for covering a wall opening that permits access to a communications wire located outside of the electrical box;

a socket for mounting a terminal of the communications wire in said second portion of the plate;

a second opening formed in said second portion of the plate for exposing the terminal of the communications wire in said front surface of the plate;

said socket being positioned in said second portion for permitting the communications wire to be connected to the terminal mounted on said socket outside of the electrical box;

a second socket formed in said second portion for mounting another communication terminal;

a third opening formed through said plate for exposing the another communication terminal in said front surface of the plate; and one of said sockets including integrally formed wall portions arranged in a rectangular pattern on said back surface of the plate for mounting a modular telephone jack on said plate and the other of said sockets including integrally formed wall portions defining a cavity in said front surface of the plate with an annular seat at a base of said cavity for mounting a male terminal of a coaxial video cable on said plate.

22. A wall plate assembly comprising:

a plate having front and back surfaces;

a main portion of said plate for covering electrical connections to an electrical outlet mounted on an electrical box that is recessed within a wall;

a first opening formed in said main portion of the plate for exposing receptacles of the electrical outlet;

a mounting hole formed in said main portion of the plate for attaching said plate to the electrical outlet;

an extended portion of said plate for covering a telephone wire and a coaxial video cable located next to the electrical box;

a telephone socket formed in said extended portion and having integrally formed wall portions projecting from said back surface of the plate for mounting a modular telephone jack on said plate;

a modular telephone jack mounted within said wall portions of the telephone socket;

a second opening in said extended portion of the plate exposing said modular telephone jack in said front surface of the plate for receiving a modular telephone plug;

a video socket formed in said extended portion and having integrally formed wall portions projecting from said back surface of the plate for mounting a male terminal of a coaxial video cable on said plate;

a male terminal of the coaxial cable mounted within said wall portions of the video socket; and a third opening formed through said extended portion exposing said male terminal in said front surface of the plate for receiving a female connector of the coaxial cable.

23. The wall plate assembly of claim 22 including a snap-on wrench for enclosing a female connector of the coaxial cable and for tightening the female connector to said male terminal.

24. The wall plate assembly of claim 23 in which said snap-on wrench is dimensioned with respect to said video socket for providing a small clearance space between said wrench and said plate.

25. The wall plate assembly of claim 22 in which said integrally formed wall portions of the telephone socket are arranged in a rectangular pattern mounting said modular telephone outlet jack to said plate.

26. The wall plate assembly of claim 25 in which said rectangularly arranged wall portions include a boss engaging a notch formed in a peripheral surface of said telephone jack.

27. The wall plate assembly of claim 26 in which said second opening is shaped to receive a modular telephone plug.

28. The wall plate assembly of claim 27 in which said integrally formed wall portions of the video socket form a cavity in said front face of the plate with an annular seat at a base of said cavity mounting said male terminal to said plate.

29. The wall plate assembly of claim 28 in which said third opening is formed through said annular seat and receives said male terminal of the coaxial video cable in a position projecting into said cavity and said cavity is sized to receive a female connector of the coaxial cable.

30. The wall plate assembly of claim 29 in which said annular seat includes a pocket capturing a nut portion of said male terminal of the coaxial cable.

* * * * *